United States Patent [19]
Shpantzer et al.

[11] Patent Number: 5,548,805
[45] Date of Patent: Aug. 20, 1996

[54] DATA COMMUNICATION SYSTEM USING SPECTRAL OVERLAY

[75] Inventors: Isaac Shpantzer, Edina; J. Eric Dunn, St. Paul, both of Minn.; Yehuda Meiman, Rishon Lezion, Israel

[73] Assignee: Racotek, Inc., Minneapolis, Minn.

[21] Appl. No.: 294,489

[22] Filed: Aug. 23, 1994

[51] Int. Cl.⁶ .................................................. H04Q 7/00
[52] U.S. Cl. ..................... 455/33.1; 455/54.1; 455/34.1; 370/95.1; 370/95.3
[58] Field of Search ................................ 455/33.1, 33.2, 455/34.1, 34.2, 54.1, 56.1, 62, 67.1, 63; 379/58, 59; 370/50, 76, 95.1, 95.3, 85.3, 18, 118; 375/260

[56] References Cited

U.S. PATENT DOCUMENTS

| | | | |
|---|---|---|---|
| 3,482,048 | 12/1969 | Takada et al. | 370/118 |
| 4,058,672 | 11/1977 | Crager et al. | 370/60 |
| 4,613,990 | 9/1986 | Halpern | 455/59.1 |
| 4,737,978 | 4/1988 | Burke | 455/33.2 |
| 4,792,948 | 12/1988 | Hangen et al. | 370/58.3 |
| 4,837,858 | 6/1989 | Ablay et al. | 455/54.2 |
| 5,282,204 | 1/1994 | Shpancer et al. | 455/54.1 |
| 5,307,341 | 4/1994 | Yates et al. | 370/18 |
| 5,386,457 | 1/1995 | Cotsonas et al. | 455/34.1 |
| 5,404,392 | 4/1995 | Miller et al. | 379/59 |
| 5,420,911 | 5/1995 | Dahlin et al. | 455/33.1 |
| 5,422,913 | 6/1995 | Wilkinson | 375/260 |

FOREIGN PATENT DOCUMENTS 2217149  10/1989  United Kingdom .

OTHER PUBLICATIONS

Dixon, *Spread Spectrum Systems*(Second Edition, 1984) John Wiley & Sons, pp. 1–55.

*Infinite Possibilities*, McCaw Wireless Data, Inc., McCaw Cellular Communications, Inc., Orlando, Florida, Mar. 22, 1994.

*Primary Examiner*—Reinhard J. Eisenzopf
*Assistant Examiner*—Marsha D. Banks-Harold
*Attorney, Agent, or Firm*—Gerstman, Ellis & McMillin, Ltd.

[57] ABSTRACT

A data communication system is provided for use with a cellular system containing an array of cells and a cellular transmitter/receiver located within each cell of the array. Each cellular transmitter/receiver is adapted for transmitting and receiving voice and/or data communication over predetermined channelized frequencies associated with the particular cell in which the cellular transmitter/receiver is located. In accordance with the invention a base data transmission station is located in each cell and is adapted for transmitting a single data stream across a plurality of channels, each of which channels is adapted to carry a single stream of information. Each base data transmitting station does not transmit on the predetermined channels that are assigned to the particular cell in which the base data transmitting station is located (i.e., those channels are "notched"). In one embodiment used channels that are carrying streams of information in adjacent cells are detected and the base data transmission station does not transmit over the frequencies of the used channels (i.e., the used channels are "notched"). In this manner, the single data stream transmitted by the base data transmitting station is transmitted over all of the channels of the cellular array except for the channels that are notched. The base data transmitting station also transmits a notching pattern, which is continuously updated, to mobile transmitters within the cell. The notching pattern comprises information concerning the channels in the cell that are notched and information concerning used channels of adjacent cells that are notched. The mobile transmitters in the cell will transmit a single data stream over all of the plurality of channels of the cellular array except for the notched channels.

20 Claims, 7 Drawing Sheets

DATA COMMUNICATION SYSTEM USING SPECTRAL OVERLAY

FIELD OF THE INVENTION

The present invention concerns a novel data communication system and, more particularly, a system providing a data overlay over radio infrastructures carrying voice communication.

BACKGROUND OF THE INVENTION

In U.S. Pat. No. 5,282,204, assigned to Racotek, Inc. of Minneapolis, Minn., a time domain data overlay over trunked radio infrastructures is disclosed. Although this time domain overlay has been found to be excellent in many respects, there are certain deficiencies.

One of the deficiencies of the time domain overlay is that the effective data transmission rates are limited due to the channelized scheme (25–30 Khz channel bandwidth) primarily designed for voice. Using the time domain overlay the data stream is transmitted over a single channel, and the baud rate is limited by the bandwidth of the channel. Typically, using the time domain system, the data transmission rate is 4800 baud. Under certain conditions however, it is highly desirable to transmit larger amounts of data much faster than 4800 baud.

Another deficiency of the time domain data overlay is that it is tightly coupled to the voice infrastructure resulting in high data latency and access time. As additional channels in a cellular radio system are being used, the latency increases exponentially. Since the load/latency characteristics of the voice and data structure affect each other, the result is a requirement for complex load balancing schemes. For example, in the Racotek time domain data overlay system it is recognized that voice should be given priority and that data may not have to be transmitted immediately. If data is to be transmitted, the channels are searched and if there is an available channel, the data is transmitted on that channel. However, if there is no available channel the system backs off and there is a programmed delay before it attempts retransmission. The back off time increases during subsequent attempts to transmit data and, with severe congestion, the back off time may run into minutes. Complex algorithms are required by the Racotek system to balance the channel seeking and back off times to prevent the system from being overloaded, to prevent the system from being driven into instability and to attempt to only marginally affect the existing customer base.

Another deficiency of the time domain overlay is that temporarily unused channels are not able to be pooled to increase the data transmission rates. The effective data rates are limited due to the fact that transmission is only in one channel which is primarily designed for voice transmission.

We have discovered a spectral overlay that serves to alleviate the deficiencies concomitant with a time domain data overlay. The spectral overlay of our invention solves a tremendous need for sending data quickly, inexpensively, and using present infrastructure.

It is, therefore, an object of the present invention to provide a data communication system that is operable to transmit data at very high effective data rates.

Another object of the present invention is to provide a data communication system that alleviates the data delays concomitant with the time domain data overlay systems.

A further object of the present invention is to provide a data communication system in which data may be transmitted at the same time that voice is being transmitted, without overloading the system.

A still further object of the present invention is to provide a data communication system in which temporarily unused channels may be pooled to increase the data transmission rates.

Other objects and advantages of the present invention will become apparent as the description proceeds.

BRIEF DESCRIPTION OF THE INVENTION

In accordance with the present invention, a data communication method is provided for use in a radio system in which voice communication is transmitted over channelized frequencies, and in which each channel is adapted to carry a single stream of information. The method comprises the steps of notching channels in a selected physical area; and transmitting a single data stream across a plurality of channels but not transmitting the single data stream on the notched channels.

As used herein, the term "notched" or "notching" refers to preventing transmission or to not transmitting on those channels that are "notched."

In one embodiment, channels which are being used in an adjacent physical area are detected and those detected used channels are notched so that the single data stream will not be transmitted in the notched channels.

In the illustrative embodiments, the streams of information comprise streams of analog or digital information and the selected physical area comprises a cell of a cellular system containing an array of cells with the adjacent physical area comprising cells that are adjacent to the selected cell.

In accordance with an illustrative embodiment of the invention, the data communication system of the present invention is for use with a cellular system containing an array of cells and a cellular transmitter/receiver located within each cell of the array. Each cellular transmitter/receiver is adapted for transmitting and receiving voice and/or data communication over predetermined channelized frequencies associated with the particular cell in which the cellular transmitter/receiver is located. The system comprises a base data transmission station located in each cell and adapted for transmitting a single data stream across a plurality of channels, each of which channels is adapted to carry a single stream of information. Each base transmitting station operates to notch the predetermined channels that are transmitted by the cellular transmitter/receiver within the particular cell in which the base data transmitting station is located. The data stream that is transmitted by the base data transmitting station is transmitted over substantially all of the channels except for the notched channels.

In one embodiment, in addition to notching the predetermined channels, channels that are carrying streams of information in adjacent cells are detected and these used channels are also notched. In this manner, the data stream that is transmitted by the base data transmitting station is not transmitted over those used channels which are notched. Of course, the channels in adjacent cells which are being used vary over time.

In one embodiment, the base transmitting station transmits a notching pattern to mobile transmitters that are within the cell. The notching pattern comprises information concerning the channels in the cell that are notched and information concerning used channels of adjacent cells that are notched. In this manner, the mobile transmitters in the cell do not transmit over the frequencies of the cell in which the mobile transmitter is located or in the channels that are being used in adjacent cells. Thus each mobile transmitter transmits a single data stream across a plurality of channels, except for the channels in which the mobile transmitter is located and the channels that are being used in adjacent cells.

In one embodiment, the mobile transmitter transmits the single data stream uplink at a power so that the power density at any active cellular frequency is at least 24 dB below the cellular power. In the illustrative embodiment, the base data transmitting station transmits the single data stream downlink at a power so that the power density at any active cellular frequency is at least 22 dB below the cellular power.

A more detailed explanation of the invention is provided in the following description and claims, and is illustrated in the accompanying drawings.

DETAILED DESCRIPTION OF THE ILLUSTRATIVE EMBODIMENTS

The overlay system of the present invention is preferably used with a cellular radio system. Although it should be understood that there is no limitation with respect to the frequency bands in which the present invention is utilized, for discussion purposes the specification will refer to an area in which there is a 10 MHz uplink band and a 10 MHz downlink band. In the illustrative embodiments, each 10 MHz band is divided into 333 channels. A hexagonal array of seven basic cells would result in each cell having 47 channels, with each channel being about 30 KHz in bandwidth.

Figure 1:
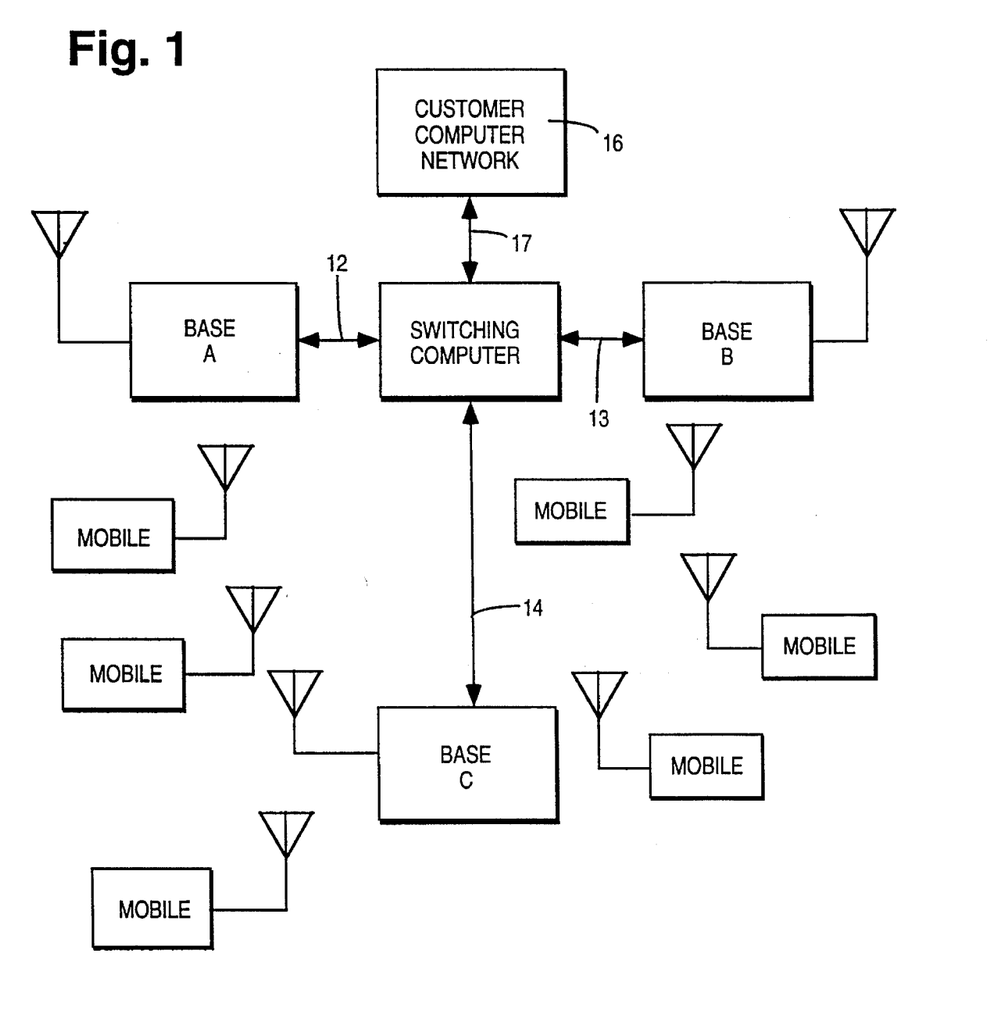
FIG. 1 is a block diagram of a data communication system in accordance with the present invention.

Referring to FIG. 1, a block diagram of a system in accordance with the present invention is illustrated. In the system, a base data transmitting/receiving station is located in each of the cells. FIG. 1 shows base dam transmitting/receiving stations A, B, C which are located in cells A, B and C respectively. Other base stations, D, E, F and G are located in the other four cells of the seven cell array. Preferably the base data transmitting/receiving stations are collocated with the cellular transmitting/receiving tower of each cell.

It is to be understood that other cellular transmitting/receiving towers, located in cells outside of the seven cell array, may also have base data transmitting/receiving stations collocated therewith. These base data transmitting/receiving stations serve to transmit data in a single data stream (containing either analog or digital information) as discussed below. A switching computer 10 couples the base stations via land lines 12, 13 and 14 and also couples the base stations through the switching computer 10 to a customer computer network 16 via land line 17. The switching computer may take the form of a distributed intelligent switching network.

A number of mobile transmitting/receiving units are also located within the cellular system. The mobile units transmit on the uplink band to the base station which transmits on the downlink band to another mobile unit and/or to the switching computer. The mobile units within cell A receive data from the base data transmitting/receiving station located within cell A.

Figure 2:
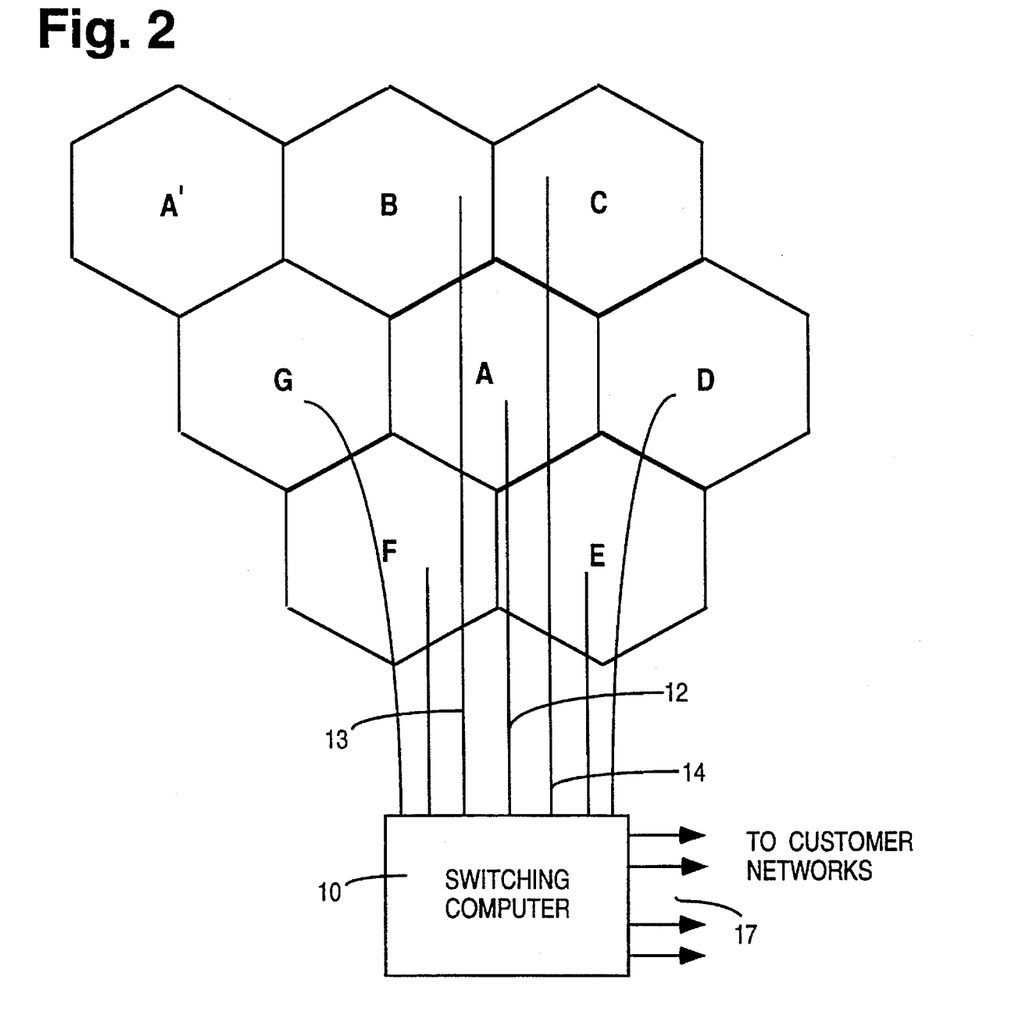
FIG. 2 is a diagram of a cellular array and switching computer in accordance with the principles of the present invention.

FIG. 2 shows an idealized view of a cellular system with cells being depicted using hexagons and being identified by a letter that corresponds to their frequency assignments. In FIG. 2, the hexagonal array comprises cells A, B, C, D, E, F and G. Each cell is assigned 47 channels which are different from each of the channels of the other cells, with each channel being 30 KHz in bandwidth. Adjacent cell $A^1$ uses the same channels as cell A (frequency reuse) because it is located far enough apart so as to not interfere with cell A. Since the other cells do not share frequencies, they do not interfere with each other. FIG. 2 also shows switching computer 10 having land lines coupled to each of the cells of the array, and also having land lines 17 coupled to customer networks.

Figure 3:
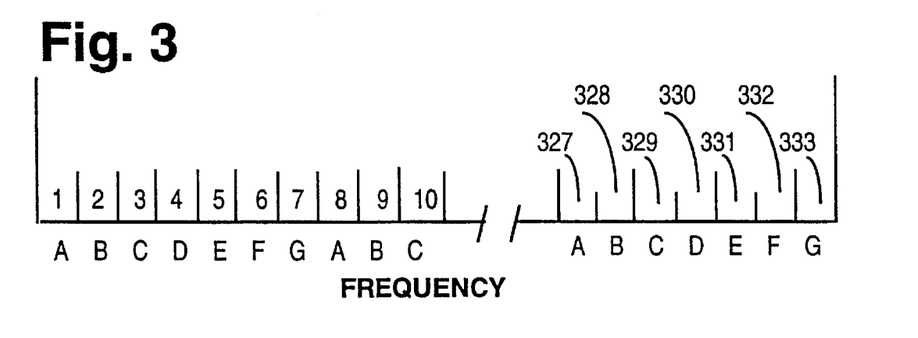
FIG. 3 is an illustration as to how frequencies are assigned in the uplink or downlink portions of the cellular frequency spectrum.

FIG. 3 is a diagram of the 10 MHz uplink band or the 10 MHz downlink band, showing the designated channel number for each "bin", with the 10 MHz band being divided into 333 channels. Each channel is 30 KHz in bandwidth and the letter designating the cells to which the channels are assigned is set forth under each channel number. Thus channel 1 is assigned to cell A, channel 2 is assigned to cell B, channel 3 is assigned to cell C, channel 4 is assigned to cell D, channel 5 is assigned to cell E, channel 327 is assigned to cell A, channel 328 is assigned to cell B, channel 333 is assigned to cell G, etc.

In accordance with the present invention, the data stream of analog or digital information to be transmitted by the mobile units or the base stations will be transmitted over the entire 10 MHz band with the exception of certain channels that are notched. These notched channels preferably comprise all of the channels assigned to the particular cell in which the base station or the mobile is located. As another embodiment, the notched channels may also comprise the channels from adjacent cells which are detected by the base station as being used, i.e., carrying voice or data. However, it is less expensive and simpler to notch only the channels assigned to the particular cell in which the base station or mobile is located and to control the power of the data transmission to reduce interference with the adjacent cells to an acceptable level.

Figure 4:
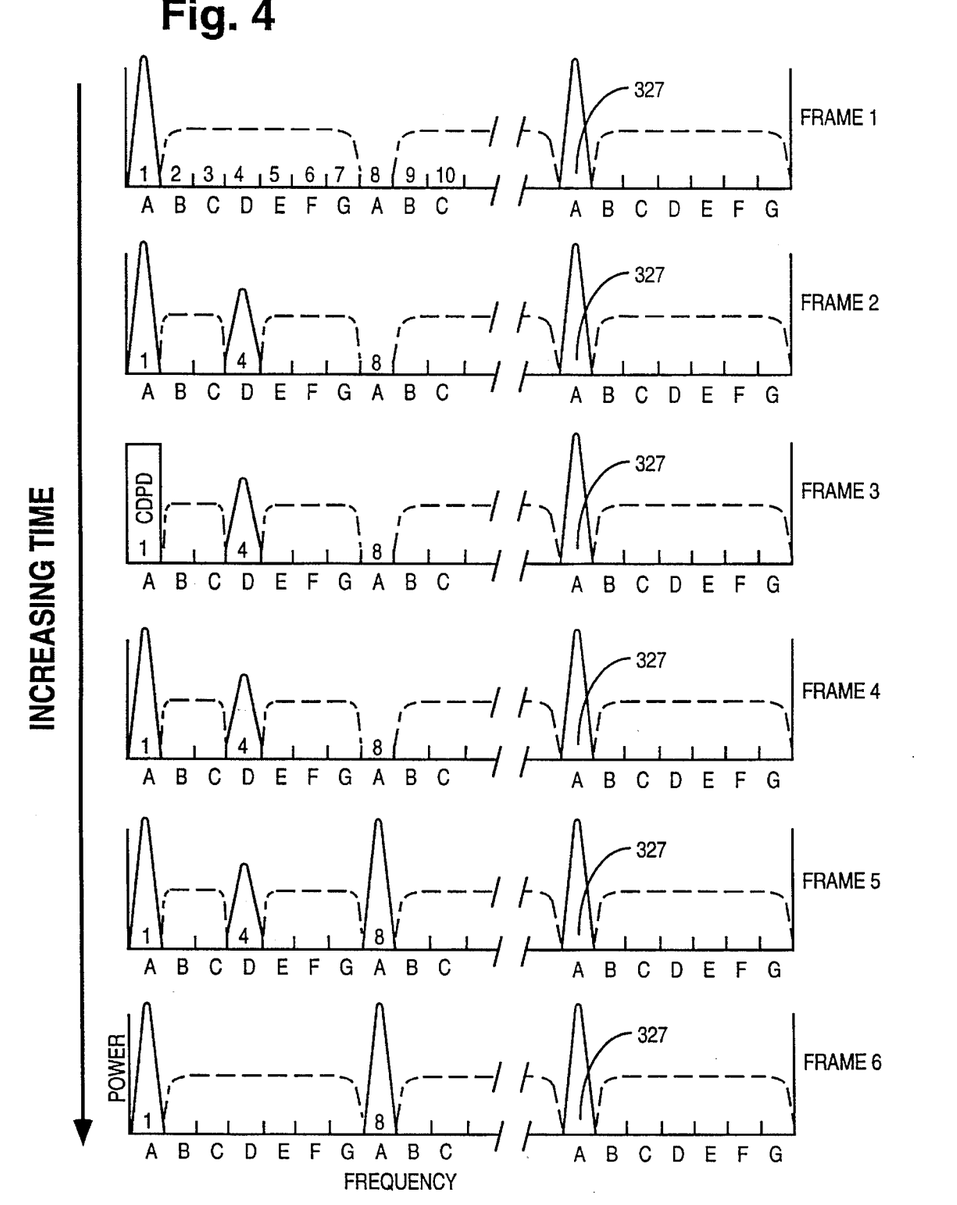
FIG. 4 shows the downlink power spectral density of transmissions within cell A of FIG. 2. Frames 1–6 show the power spectrum at closely spaced intervals of time.

FIG. 4 shows the power spectral density of transmissions over a period of time. The frequency bins correspond to those shown in FIG. 3. The solid curves in channel 1 and channel 327 represent cellular voice transmissions. The dashed line represents a data transmission in accordance with the present invention.

It can be seen that the data transmission from a mobile unit in cell A or from the base station in cell A is over the entire frequency spectrum (the entire 10 MHz band) except for certain channels which are notched. In frame 1, the only notched channels shown are the channels assigned to cell A, which in frame 1 are channels 1, 8 and 327. It is understood, however, that channel A has 47 designated channels, and, in this preferred embodiment, all 47 channels assigned to cell A are notched.

Thus in the illustrative embodiment, the data transmission is notched at all frequencies assigned to the collocated cellular system. Further, the data transmission spans multiple cells. Still further, the data transmission has lower power within each channel to alleviate any interference with other transmissions.

FIG. 4, frame 2 shows the power spectrum at a short time interval after the power spectrum of frame 1. In frame 2, a D cell voice transmission has begun. It is received at the A cell at a lower power level due to the attenuating effects of distance. The A cell notching pattern adjusts itself to minimize interference with this transmission in the D cell by notching cell 4. Now the data transmission is over the entire frequency spectrum except for the channels assigned to the A cell and except for channel 4.

As stated above, it may be preferable for economical reasons to notch only the channels assigned to the cell in which the mobile unit is located. To this end, instead of notching the used channels in adjacent cells, the power of the data transmission is controlled in a manner that will reduce interference with the adjacent cells to an acceptable level. However, in the FIG. 4 embodiment the channels of adjacent cells which are detected as being used are notched, i.e. channel 4 from adjacent cell D is notched.

It should be understood that as used herein, the term "adjacent" refers to closely located cells; such cells may be contiguous or they may be spaced from each other a certain extent.

In FIG. 4, frame 3, the voice transmission in channel 1 has been replaced by a CDPD transmission. This has no effect on the data transmission of the present invention because channel 1, which is assigned to cell A, is notched for the mobile units and the base station in cell A.

In frame 4, the CDPD transmission has ended and another voice transmission has started in channel 1. Frame 5 shows another A cell voice transmission in channel 8 which has no effect on the data transmission of the present invention because channel 8 was notched. In frame 6, the D cell transmission in channel 4 has ended, and the data transmission system of the present invention adjusts its notching pattern accordingly so that channel 4 is no longer notched and the data can be transmitted over channel 4 as well as all of the other channels that are not notched.

Figure 5:
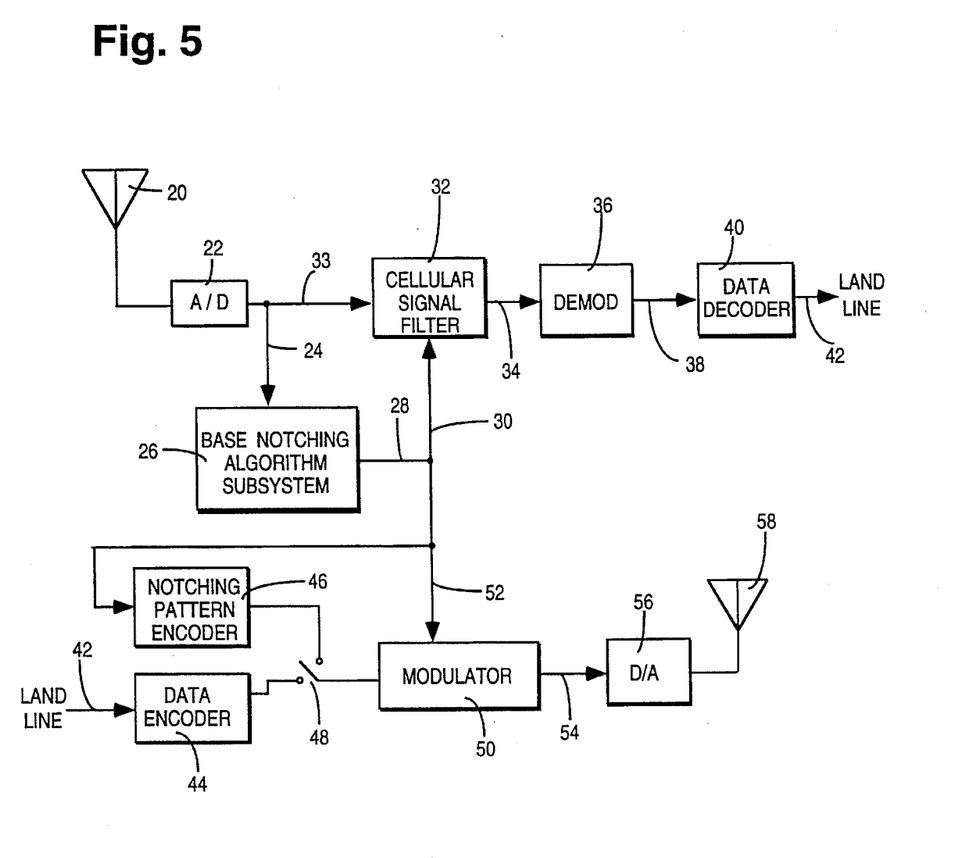
FIG. 5 is a block diagram of the base transmitter/receiver station of the system of FIG. 1.

A block diagram of the base data transmitting/receiving station is illustrated in FIG. 5. It should be understood that in the block diagrams shown herein, ordinary elements that are well known in the art such as preamplifiers, amplifiers and filters are not shown in order for the block diagram to be simplified, but one skilled in the art would utilize these conventional elements as required.

Referring now to FIG. 5, the uplink spectrum is received via antenna 20. Thus antenna 20 receives transmissions from mobile units which transmissions include the data transmissions of the present invention and also include cellular transmissions. These analog signals are fed through an analog to digital converter 22, and the digitized signal is fed via line 24 to base notching algorithm subsystem 26. The subsystem 26 provides a representative digital signal with zeros connoting what should be notched out and with ones connoting what should not be notched out in the frequency domain. It is to be understood that this connotation could be reversed so that zeros connote what should not be notched out and ones connote what should be notched out. The digital signal forming the notching pattern is fed via line 28 and via line 30 to a cellular signal filter 32.

The digitized data transmission of the present invention and also the cellular transmissions are fed via line 33 to cellular signal filter 32. The notching pattern on line 30 effectively controls the cellular signal filter 32 so that it will filter out all of the cellular transmission. Output line 34 from cellular signal filter 32 will carry only the data transmitted by the present invention because the cellular channels have been notched out.

The data on line 34 is fed to a demodulator 36, the output 38 of which is fed to a data decoder 40, the output of which is the customer's data. Decoder 40 checks to ensure that the data is valid. This data is now transmitted via land line 42 to the switching computer 48. If a mobile unit was intending to communicate with another mobile unit in the same or in a different cell, the switching computer 48 would operate to transmit the data on line 42 via data encoder 44 (FIG. 5). A notching pattern encoder 46 provides error correction and redundancy so that the notching pattern can be received without error even if there are strong interfering signals. Data encoder 44 is provided to add extra bits for detecting and correcting the errors. Switching computer 48 operates to alternate between sending the notching pattern and sending the encoded data to the data modulator 50. Data modulator 50 uses the notching pattern from base notching algorithm subsystem 26 via line 52 to provide the modulated data on line 54 in digital form. The modulated data is fed to a digital to analog converter 56 where the data in analog form is transmitted via antenna 58 downlink.

FIG. 2 shows the connection of switching computer 10 to the cells indicating how the switching computer determines whether the data is to be transmitter to a customer's LAN (local area network) via a leased line or whether it should be switched back to the cells for transmission to a mobile customer or to a customer who is receiving the information by radio rather than by leased line.

Figure 6:
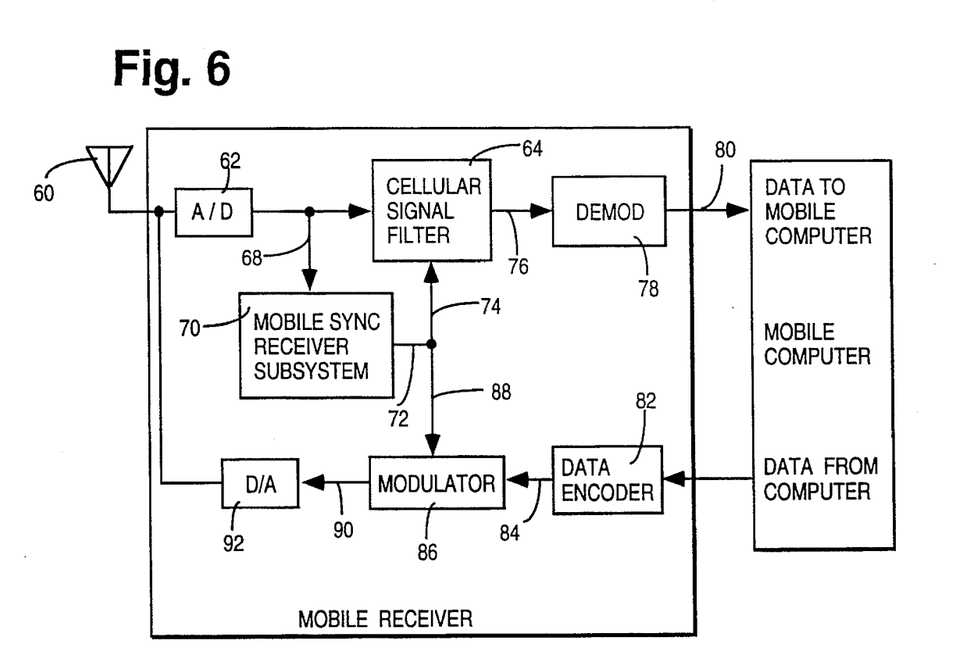
FIG. 6 is a block diagram of the mobile transmitter/receiver unit of the system of FIG. 1.

A block diagram showing the mobile unit is illustrated in FIG. 6. Referring to FIG. 6, antenna 60 receives the cellular and data transmission on the downlink and the data is transmitted via an analog to digital converter 62 to a cellular signal filter 64 via line 66. The cellular transmission and data transmission in digital form is also transmitted via line 68 to mobile sync receiver subsystem 70, the output 72 of which is the notched pattern transmitted by the base station. The notching pattern operates via line 74 to cellular signal filter so that the cellular signal filter 64 will filter out the cellular information and output line 76 of filter 64 will contain only the data transmission in modulated form. This data is demodulated by demodulator 78 and the output 80 comprises the demodulated data information such as the data transmitted by the customer. This data is sent via line 80 to the mobile computer. Data from the mobile computer is encoded by encoder 82, in which detection and error correction is added and this is fed via line 84 to modulator 86. The notching information on line 72 is fed via line 88 to modulator 86 so that the output on line 90 will contain the modulated data signal which is converted from digital to analog via digital to analog converter 92 and is then transmitted uplink via antenna 60.

Figure 7:
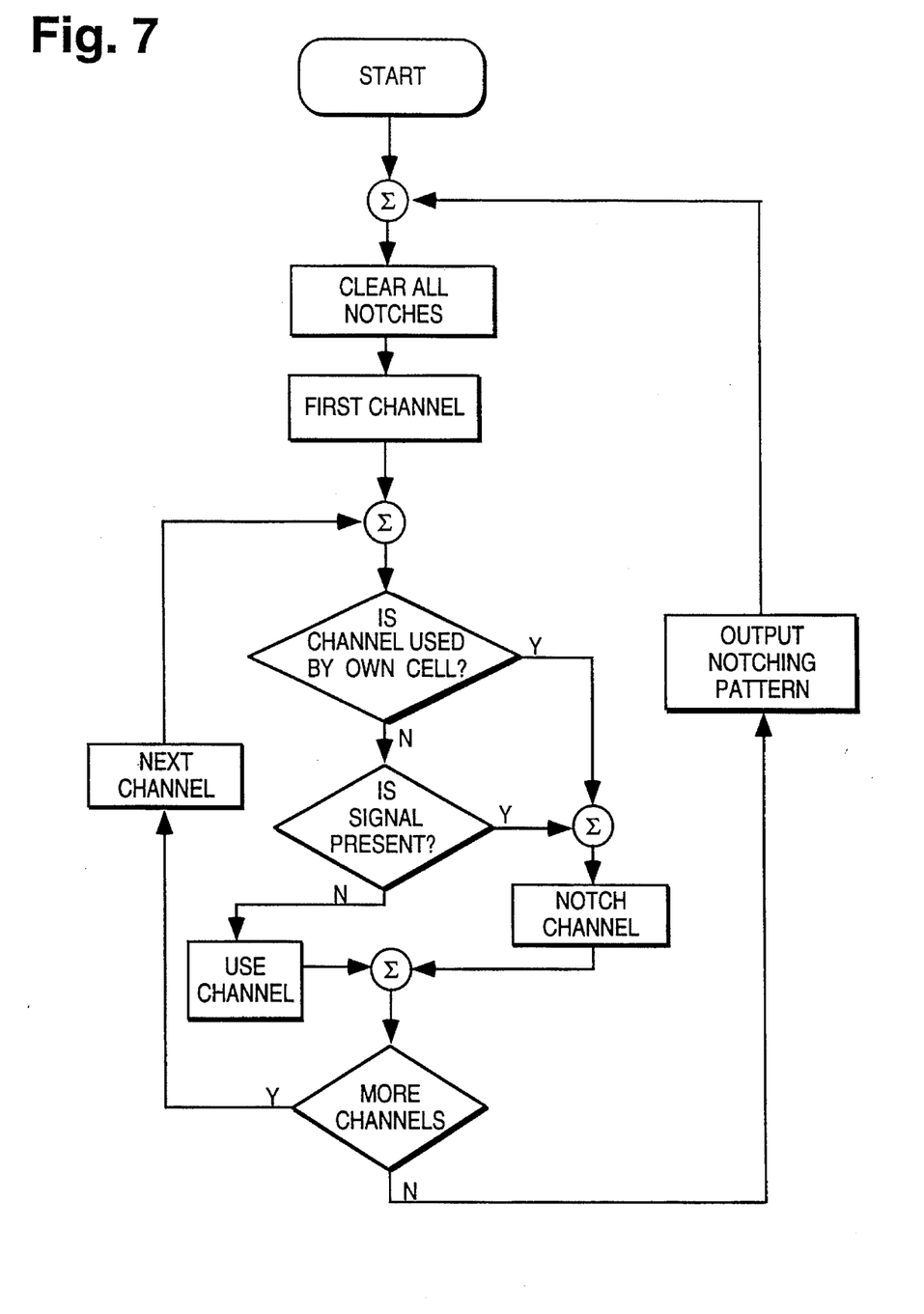
FIG. 7 is a flow chart showing how the base station determines what channels should be notched.

The base station notching algorithm is illustrated in the flow chart of FIG. 7. First, all notches are cleared. Next, the first channel (e.g. channel 1) is monitored. A determination is made whether that channel is used by the base station's own cell, which is cell A in this example. In other words, is the base station located in a cell to which the first channel is assigned? If so, that channel is notched. A determination is then made whether there are more channels. If there are more channels, the next channel (e.g. channel 2) is monitored. A determination is then made whether the next channel, channel 2, is assigned to the cell in which the base station is located. It is not so, a determination is made if a signal is present in channel 2. If a signal is present in channel 2, channel 2 is notched and the system looks for more channels. If a signal is not present in channel 2, channel 2 is not notched. The system then goes to the next channel which is channel 3. A determination is made whether channel 3 is in cell A. It is not so, a determination is then made whether a signal is present in channel 3. If a signal is present in channel 3, that channel is notched but if a signal is not present the system loops back.

Once the system has gone through the entire spectrum and there are no more channels, the base station then transmits a notching pattern back to the mobiles. This is the notching pattern on line 28 of FIG. 5. The mobile units will then have the notching pattern in their computer. The system of the present invention provides a notching pattern transmission that is updated continuously. It checks the spectrum, determines which channels can be used, and transmits that information with the notching pattern to the mobiles. In short, whenever a mobile is in a particular cell, that mobile will receive a notching pattern that notches all of the mobile's own cell's channels as well as the channels of adjacent cells that are being used, with such use having been monitored by the base that is in the mobile's own cell. As stated above, for economy it may be desirable to only notch all of the mobile and base station's own cell's channels, and not to notch channels of adjacent cells.

The notching pattern information from the base station is transmitted with a lot of redundancy, so that the information can get through from the base station to the mobile. When the mobile goes from one cell to another cell, for example the A cell to the B cell, the mobile will receive the B cell notching information. In effect, the mobile unit will receive the signal from whichever cell's base station has providing the stronger signal. If the mobile unit is near the A cell and the B cell's dividing line, it may receive either the notching pattern from the A cell base station or the notching pattern from the B cell base station. Whichever it receives, the stronger signal will be the best path on which to transmit.

Figure 8:
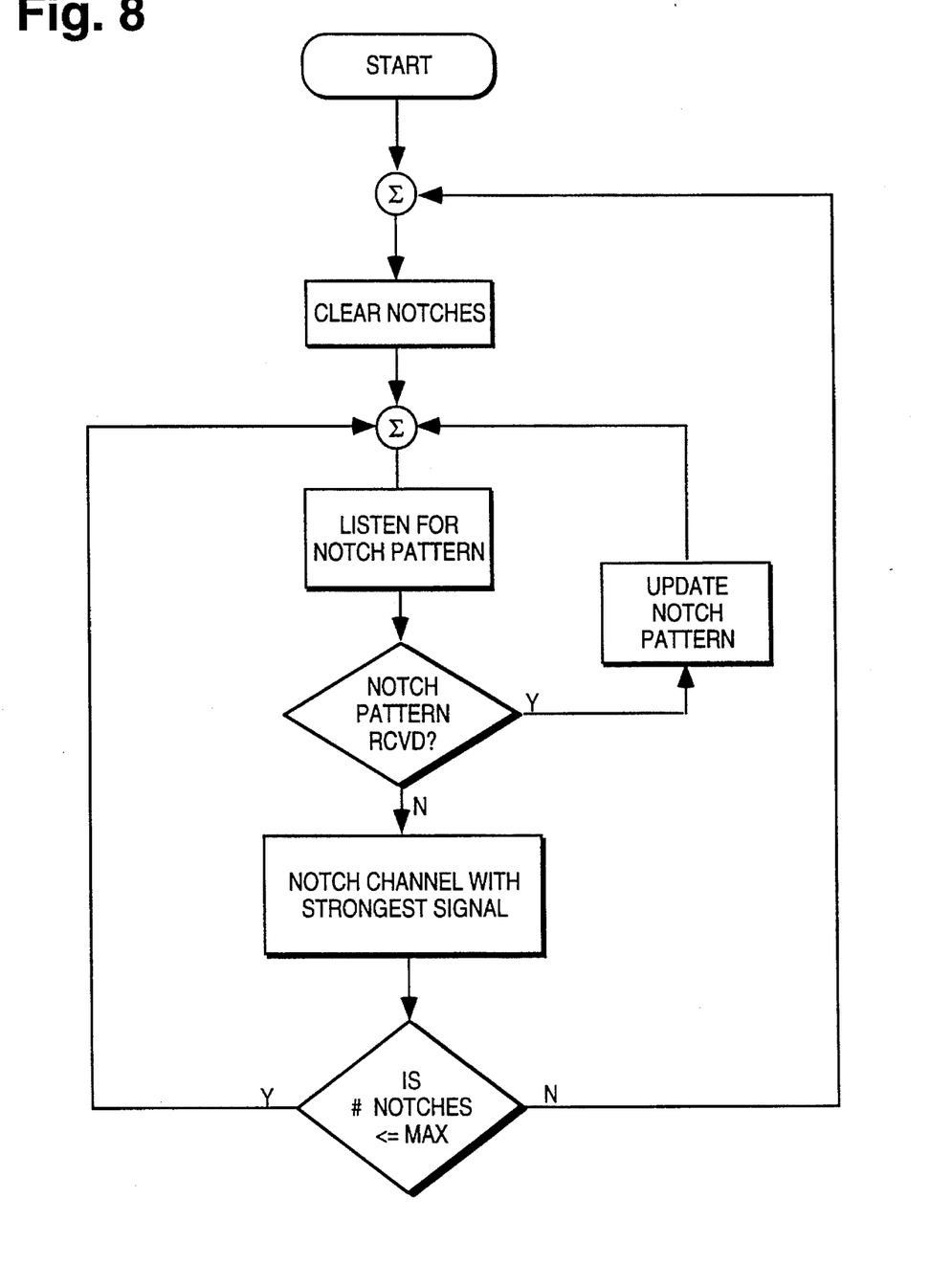
FIG. 8 is a flow diagram showing how a mobile transmitter/receiver unit acquires and tracks the notching pattern.

FIG. 8 shows a flow diagram of the synchronization for the mobile unit itself. First, the mobile unit clears notches and then listens for a notch pattern. If it receives the notch pattern, it updates the notch pattern that is in the mobile computer. If a notch pattern is not received, the mobile computer itself notches the channel with the strongest signal. That will remove the strongest interfacing signal. Initially, the system is listening on all of the channels until it receives the notch pattern. Once it receives the notch pattern, it can then transmit. The channel with the strongest signal is the channel most likely to interfere, so that channel is notched out if no notch pattern has been received. Once that channel with the strongest signal is notched, a determination is made whether the number of notches is less or equal to the maximum number of notches that are permitted. Thus if all channels have been notched and the notching pattern has not been received, the system determines that there is error and it begins again. Once the channel with the strongest signal has been notched, and there are still other notches possible, the system continues to monitor and if the notch pattern is not received the next channel with the strongest signal is notched. So long as a notch pattern has not been received, the system continues to cycle and notch channels. Because of the interference from the stronger signal channels, the mobile may not have heard the notch pattern but once those channels are notched out, there is expected to be a lack of interference so that the notch pattern can then be received and updated.

Once the notch pattern is updated, the system will be tree of interference. This is because the channels in the mobile unit's cell have been notched out and the channels being used in adjacent cells have been notched out so that the only possible interference could be from new transmissions from a different cell. Such transmissions would be relatively weak and it is expected that there would only be a small amount of such conversation because the system updating is occurring constantly.

In order to prevent interference with cellular transmissions, the system of the present invention preferably transmits at a power that is below cellular transmission power, does not emit any power in any of the frequencies in use within its own cell and does not emit any power in frequencies that are being used in adjacent cells. We have discovered that to prevent unacceptable interference with the cellular transmissions in adjacent areas, it is necessary for the system to transmit at 24 decibels below cellular transmission power in the cellular uplink to prevent interference and to transmit at at least 22 decibels below cellular transmission power in the downlink. We have determined that the formula for the power data transmission signal $P_n$ of the present invention in the uplink is equal to $P_c \times 10^{-24/10}$ wherein $P_c$ is the cellular power in the channel under consideration. $P_n$ is the maximum power per channel that the data transmission can utilize in order to avoid interference. If the system is going to be transmitting over at least 40 cells, for example, this power factor $P_n$ can be multiplied by 40 to determine the full dam transmission power. Thus a determination is made as to the least amount of cells that are possibly going to be used as the worst case scenario, and that number of channels is multiplied by $P_n$. In the downlink, the formula is $P_n = P_c \times 10^{-22/10}$. Under these conditions, the system may transmit on all channels used in adjacent cells without creating unacceptable interference.

The system of the present invention has many advantages over a time domain data overlay. Such advantages include extremely high dam rates on a voice saturated cellular cell, local area network—like low latency packet data network performance in each cell, since no coupling exists between voice/data medium access control schemes, soft hand-off between cells resulting in much simpler over the air protocols, improved multi-path and fading resiliency due to spectral diversity as well as in building coverage, collocation of the base data transmitting/receiving station and cellular base equipment with no logical or physical coupling required, and an aggregate mobile data capacity that is proportional to the number of used cell sites.

Typically, the system of the present invention will be capable of data rates of over 400 kilobauds. Interference with the cellular system would be no more than −18 dB per channel per cell. This will provide a cost effective, spectrally efficient, high speed data transmission alternative that is not currently available.

Although illustrative embodiments of the invention have been shown and described, it is to be understood that various modifications and substitutions may be made by those skilled in the art without departing from the novel spirit and scope of the present invention.

We claim:

1. A data communication method for use in a radio system in which information is transmitted over channelized frequencies, each of which channels is adapted to carry a single stream of information, comprising the steps of:

notching predetermined channels in a selected physical area; and transmitting a single data stream divided across a plurality of channels simultaneously, but not transmitting said single data stream on the channels that are notched.

2. A data communication method as defined by claim 1, in which all channels in said selected physical area are notched.

3. A data communication method as defined by claim 1, in which said streams of information comprise streams of analog or digital information.

4. A data communication method as defined by claim 1, including the steps of detecting used channels in an adjacent physical area that are carrying streams of information; and notching said used channels.

5. A data communication method as defined by claim 4, in which said selected physical area comprises a selected cell of a cellular system containing an array of cells and said adjacent physical area comprises cells that are adjacent to said selected cell.

6. A data communication method as defined by claim 5, including the step of transmitting the single data stream uplink at a power so that the power density at any active cellular frequency is at least 24 dB below the cellular power.

7. A data communication method as defined by claim 5, including the step of transmitting the single data stream downlink at a power so that the power density at any active cellular frequency is at least 22 dB below the cellular power.

8. A data communication method as defined by claim 4, in which the step of detecting comprises monitoring the downlink frequency spectrum.

9. A data communication method as defined by claim 1, including the step of transmitting a notching pattern to mobile transmitters located within said selected physical area.

10. A data communication method for use in a cellular radio system capable of transmitting and receiving voice and/or data communication and including a plurality of adjacent cells with each cell having a cellular base transmitter for transmitting over predetermined channelized frequencies associated with the particular cell in which the cellular base transmitter is located, comprising the steps of:

providing a base data transmitting station in each cell;

programming each said base data transmitting station not to transmit in frequencies of the cell in which said base data transmitting station is located; and operating each base station to transmit a single data stream divided across a plurality of channels of frequencies of adjacent cells simultaneously but not to transmit over the frequencies of the cell in which said base data transmitting station is located.

11. A data communication method as defined by claim 10, including the steps of detecting which channels are being used in adjacent cells and not transmitting in channels that are detected as being used in adjacent cells.

12. A data communication method as defined by claim 11, in which the step of detecting comprises monitoring the downlink frequency spectrum.

13. A data communication method as defined by claim 10, including the step of operating each base data transmitting station to transmit a notching pattern to mobile transmitters located within the cell of the base data transmitting station.

14. A data communication method for use with a cellular system containing an array of cells and a cellular transmitter/receiver located within each cell of said array, with each cellular transmitter/receiver being adapted for transmitting and receiving voice and/or data communication over predetermined channelized frequencies associated with the particular cell in which the cellular transmitter/receiver is located, which comprises the steps of:

locating a base data transmission station in each cell for transmitting a single data stream across a plurality of channels, each of which channels is adapted to carry a single stream of information;

notching the predetermined channels that are transmitted by the cellular transmitter/receiver within the particular cell in which the base data transmitting station is located;

detecting used channels in adjacent cells that are carrying streams of information;

notching said used channels whereby the base data transmission station within a particular cell is prevented from transmitting in said used channels; and transmitting a single data stream by the base data transmitting station divided over substantially all of said plurality of channels simultaneously, but not transmitting said single data stream on the channels that are notched.

15. A data communication method as defined by claim 14, including the steps of transmitting a notching pattern to mobile transmitters within the cell, said notching pattern comprising information concerning the channels in the cell that are notched and information concerning used channels of adjacent cells that are notched; and transmitting from each mobile transmitter a single data stream spread across a plurality of channels simultaneously except for the channels in which the mobile transmitter is located and the channels that are being used in adjacent cells.

16. A data communication method for use with a cellular system containing an array of cells and a cellular transmitter/receiver located within each cell of said array, with each cellular transmitter/receiver being adapted for transmitting and receiving voice and/or data communication over predetermined channelized frequencies associated with the particular cell in which the cellular transmitter/receiver is located, which comprises the steps of:

locating a base data transmission station in each cell and adapted for transmitting a single data stream across a plurality of channels, each of which channels is adapted to carry a single stream of information;

detecting used channels that are carrying streams of information;

notching said used channels whereby the base data transmission station within a particular cell is prevented from transmitting in said used channels; and transmitting the single data stream divided over a plurality of channels simultaneously while not transmitting the single data stream on the channels that are notched.

17. A data communication method for use in a radio system in which information is transmitted over a plurality of channelized frequencies, each of which channels is adapted to carry a single stream of information, comprising the steps of:

detecting channels carrying information;

notching channels carrying information; and transmitting a single data stream divided across a plurality of channels simultaneously, but not transmitting said single data stream on the channels that are notched.

18. A data communication method as defined by claim 17, including the steps of detecting used channels in adjacent cells and transmitting to said mobile transmitters a notching pattern comprising information concerning the detected used channels.

19. A data communication method as defined by claim 17, including the step of transmitting the single data stream uplink at a power so that the power density at any active cellular frequency is at least 24 dB below the cellular power.

20. A data communication method as defined by claim 17, including the step of transmitting the single data stream downlink at a power so that the power density at any active cellular frequency is at least 22 dB below the cellular power.

* * * * *